United States Patent [19]
Swiatovy, Jr.

[11] 4,093,414
[45] June 6, 1978

[54] SINGLE DIE CO-EXTRUSION APPARATUS FOR INSULATION

[75] Inventor: Edward Stanley Swiatovy, Jr., Bonham, Tex.

[73] Assignee: General Cable Corporation, Greenwich, Conn.

[21] Appl. No.: 723,783

[22] Filed: Sep. 16, 1976

[51] Int. Cl.² ............................................. B29F 3/10
[52] U.S. Cl. .................................... 425/113; 425/133.1; 425/462; 425/817 C
[58] Field of Search ............... 264/45.9, 46.1, 171, 264/174, 245, 260, 272; 425/4 C, 817 C, 133.1, 113, 114, 462

[56] References Cited
U.S. PATENT DOCUMENTS

| | | | |
|---|---|---|---|
| 3,111,712 | 11/1963 | Frate | 425/113 |
| 3,635,620 | 1/1972 | Brown | 425/133.1 X |
| 3,737,490 | 6/1973 | Nicholson | 264/174 X |

Primary Examiner—Francis S. Husar
Assistant Examiner—Mark Rosenbaum
Attorney, Agent, or Firm—Roy C. Hopgood; John M. Calimafde; Charles W. Neill

[57] ABSTRACT

This invention is a single die by which thermoplastic insulating compounds can be co-extruded without any die for the first layer. It makes possible the extrusion of a high-density solid polyethylene skin layer over a cellular polyethylene primary insulation. Such a combination is difficult or impossible to make with a conventional co-extrusion die having a wire guide tip, one combination tip/die and a secondary extrusion die.

12 Claims, 2 Drawing Figures

SINGLE DIE CO-EXTRUSION APPARATUS FOR INSULATION

BACKGROUND AND SUMMARY OF THE INVENTION

With the advent of interest in foam/skin insulated telephone wire, it has been learned that satisfactory results are difficult or impossible to attain by conventional co-extrusion systems. Such conventional equipment feeds the conductor to a tip and a primary melt is discharged along the outside of the tip and into contact with the conductor before the conductor and adhered melt passes through a first extrusion die. The outside of this first extrusion die is tapered to provide another tip surface along which a secondary melt is discharged into contact with the primary melt layer as the conductor and its adhered coating advance through the second tip. The conductor with the co-extruded layers then passes through a secondary extrusion die. In order to apply a foam/skin insulation over the conductor, the first extrusion die applies a cellular polyethylene layer, usually high density polyethylene, and the second extrusion die applies a solid polyethylene skin (high density) over the cellular insulation. The principal difficulties encountered with conventional co-extrusion systems relate to a lack of smoothness of the insulation; disruption of the cellular structure of the primary layer; and lack of dielectric strength. These problems are magnified as the melt index of the compound used for the outer skin is lowered.

This invention overcomes these difficulties by using only one tip and one extrusion die; and by applying the two layers of insulating material successively with a melt-flow separator between the supplies of insulation as they approach the end of the tip through which the conductor passes. With this invention, the primary and secondary insulations are sized simultaneously and no cellular or surface disruption occurs. Relative wall thickness of the primary and secondary insulations are controlled by adjusting the relative speed with which the different insulations are supplied to the extruder die.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
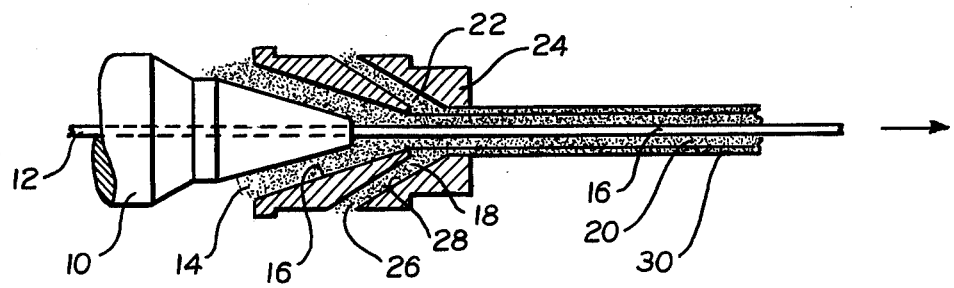
FIG. 1 is a diagrammatic view of a conventional co-extrusion system having successive tips and dies.

The conventional apparatus of the prior art, illustrated in FIG. 1, has a first tip 10 through which a conductor 12 passes to the discharge end of the tip. Hot insulating material 14 is fed through an annular passage 16 surrounding the tip 10 and providing an annular clearance, with a taper corresponding to substantially that of the tip 10. The insulating material 14 contacts with the conductor 12 at the discharge end of the tip, and the thickness of the insulation applied to the conductor is determined by a first extruder die 18. The thickness of an insulation wall, made by the insulation 14, and designated by the reference character 20, depends upon the diameter at the discharge end of the extruder die 18.

The outside of the extruder die 18 is tapered to serve as a second tip, indicated by the reference character 22 at the outlet end of this second tip 22.

The second tip is spaced from a second extruder die 24 which has its inner surface tapered and spaced from the tip 22 to provide for passage of insulating material 26 to the discharge end of the second tip 22. This passage for the insulating material 26 is designated by the reference character 28 in FIG. 1.

The wall thickness of a second layer 30 is determined by the diameter of the opening through the extrusion die 28. As pointed out above, this equipment is unsatisfactory for applying a solid skin layer of insulation over a cellular layer.

Figure 2:
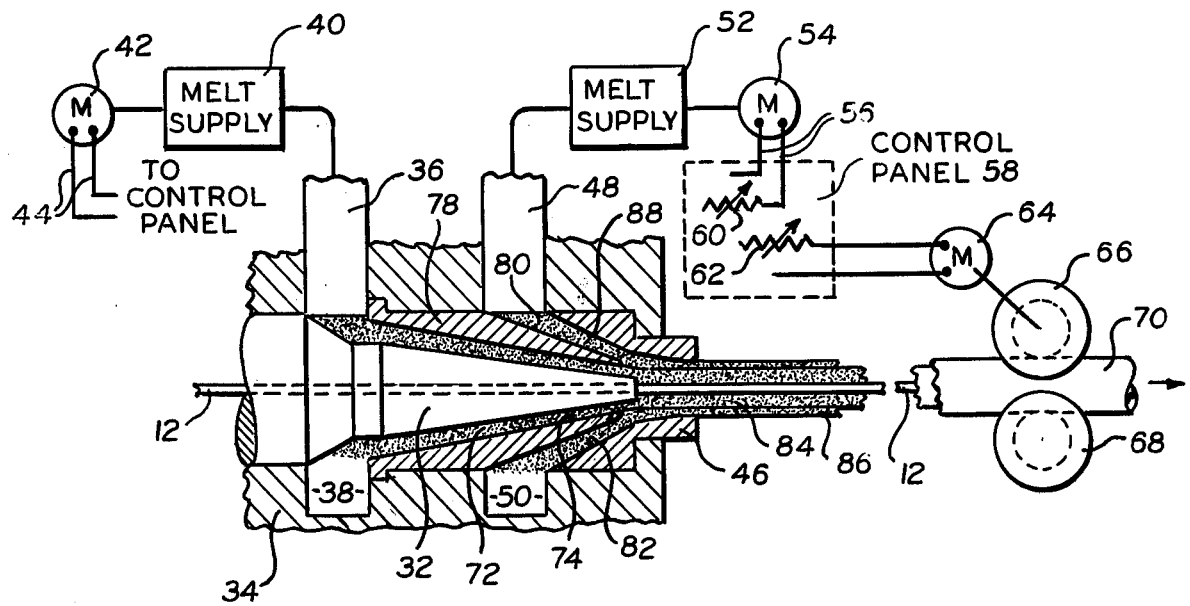
FIG. 2 is a diagrammatic sectional view showing the single die co-extrusion system of this invention.

FIG. 2 shows the improved apparatus of this invention. A single tip 32 is mounted in a fixed position in a frame 34 of the extruder apparatus. A melt supply passage 36 feeds the cellular melt material to a chamber 38 surrounding the upper end of the tip 32; and the cellular insulating material is supplied through the passage 36 from melt supply apparatus indicated by the reference character 40. The rate of speed of the melt material from the apparatus 40 is controlled by a motor 42 connected by conductors 44 with a control panel.

The structure shown in FIG. 2 has only one extruder die, designated by the reference character 46. The melt material for a second layer of insulation is supplied through a passage 48 to an annular chamber 50 in the frame 34. The rate at which the insulation is supplied through through the passage 48 is determined by the rate at which melt supply apparatus 52 is driven by a motor 54 connected by conductors 56 with a control panel 58.

The control panel 58 is shown diagrammatically with controls 60 and 62 for varying the speed of the motor 54 and another motor 64, the latter being used to drive a feed roll 66, which cooperates with another roll 68 to advance the insulated conductor 70, which is shown on an enlarged scale at the right hand side of FIG. 2.

A speed control similar to the control 60 is in the circuit of the motor 42, and the rate of speed of the motors 42, 52 and 64 are adjustable and can be subject to automatic control by programming apparatus, the details of which form no part of the present invention.

The cellular plastic insulation for the first layer is indicated by the reference character 72, and the passage through which it travels along the outside of the tip 32 is indicated in FIG. 2 by the reference character 74.

A melt flow separator 78 is secured in a fixed position surrounding the tip 32 and spaced from the tip to provide the passage 74. The outside surface of the melt flow separator 78 provides one side of a passage 80 through which insulation from the passage 48 flows toward the extruder die 46, and there is space between this outside surface and the interior of the extruder die 46 leaving a passage 82 for the insulation material that will form the second layer.

An important feature of the construction is that the melt flow separator merely keeps the insulating materials from merging before they are close to the discharge end of the tip 32. It should be noted that the melt flow separator 78 terminates some distance back from the end of the tip 32. The essential feature is that the melt flow separator 32 must not extend far enough to constitute an extrusion die which determines the wall thickness of the first layer of insulation and which is a factor in determining how much of the insulating material 72 is applied to the conductor per unit of length of the conductor.

The extruder die 46 determines the wall thickness of the composite insulation applied to the conductor 12. The thickness of the inner insulation layer 84 with respect to the outer insulation layer 86 is not determined by successive extrusion dies as in FIG. 1, but is determined by the rate at which the material 72 for the inner layer 84 and material 88 for the outer layer 86 are supplied to the chambers 38 and 50 from the melt supply apparatus 40 and 52, respectively. This results in smoothness for both layers of insulation, avoids disruption of the cellular structure of the inner layer and insures the dielectric strength of the insulation of both layers.

The preferred embodiment of the invention has been illustrated and described but changes and modifications can be made and some features can be used in different combinations without departing from the invention as defined in the claims.

I claim:

1. A single die for co-extrusion including in combination a tip having a wire passage extending lengthwise therethrough and tapering to a smaller diameter toward a discharge end of the passage at the forward end of the tip, an extrusion die surrounding a forward end portion of the tip and having an inside surface that confronts the tapered surface of the tip and that is spaced from the confronting surface of the tip to leave an annular passage between the confronting surfaces for the flow of plastic electrical insulating material through said annular passage, characterized by a melt flow separator extending into the space between said confronting surfaces and dividing said space into two passages, one of which has its sides converging to reduce the radial width of the passage along the entire portion of its length that confronts the flow separator, for different materials for forming superimposed layers of insulation, the melt flow separator extending for a portion and only a portion of the length of said annular passage, the melt flow separator terminating at its forward end at a location spaced back from the discharge end of the tip so that the separator cannot serve as an extrusion die for said tip, passages in communication with said two passages for supplying different insulating material to the upstream ends of each of said two passages on the different sides of the melt flow separator, and the extrusion die having a tapered passage therein extending beyond the tip and in which the superimposed layers of insulation are sized before discharge from the die.

2. The die described in claim 1 characterized by the melt flow separator being annular and having its radial cross section tapered to provide an inner face that confronts a part of the tapered surface of the tip and an outer face that confronts a part of the inside surface of the die.

3. The single die structure described in claim 1 characterized by the inside surface of the extruder die being tapered to a lesser diameter toward its forward end and along said portions of said inside surface that confront the tip beyond the forward end of the melt flow separator.

4. The single die structure described in claim 3 characterized by the inside surface of the die being tapered to a lesser diameter toward its forward end and along portions of said inside surface that is beyond the forward end of the tip.

5. The single die structure described in claim 3 characterized by the extrusion die and the melt flow separator forming the opposite sides of the flow passages for the outer layer of insulation, along the full length of that flow passage, and the extrusion die having its inside surface tapered along the entire portion of its length that confronts the melt flow separator.

6. The single die structure described in claim 4 characterized by the taper of the inside surface of the extrusion die extending beyond the forward end of the tip having a smaller angle of taper than it has upstream from the end of the tip and the inside surface of the extrusion die terminating in a cylindrical surface along the portion of the inside surface near the discharge end of said extruder die.

7. The single die structure described in claim 1 characterized by supporting structure with which the tip, separator and die are held in contact and maintained in concentric relation with the wire passage of the tip and with each other.

8. The single die structure described in claim 1 characterized by separate means connected with each of said two passages and communicating with the respective passages for supplying plastic electrical insulating material to the upstream ends of the respective passages which are formed by the separator, and means operatively associated with said supplying means for regulating the rate of supply of material to the upper ends of said two passages.

9. The single die structure described in claim 8 characterized by controls operatively associated with each of said separate means for adjusting the rate of materials supplied to one passage with respect to the other to regulate the relative thickness of the layers of material applied to the wire.

10. The single die structure described in claim 8 characterized by means operatively associated with said die for advancing a wire through the tip and die, and a control operatively associated with said advancing means for regulating the speed of the wire with respect to the rate at which material is supplied to said two passages.

11. A single die for co-extrusion including in combination a tip having a wire passage extending lengthwise therethrough and tapering to a smaller diameter toward a discharge end of the passage at the forward end of the tip, an extrusion die surrounding a forward end portion of the tip and having an inside surface that confronts the tapered surface of the tip and that is spaced from the confronting surface of the tip to leave an annular passage between the confronting surfaces for the flow of plastic electrical insulating material through said annular passage, characterized by a melt flow separator extending into the space between said confronting surfaces and dividing said space into two passages for different materials for forming superimposed layers of insulation, the melt flow separator extending for a portion and only a portion of the length of said annular passage, the melt flow separator terminating at its forward end at a location spaced back from the discharge end of the tip so that the separator cannot serve as an extrusion die for said tip, passages in communication with said two passages for supplying different insulating material to the upstream ends of each of said two passages on the different sides of the melt flow separator, and the extrusion die having a tapered passage therein extending beyond the tip and in which the superimposed layers of insulation are sized before discharge from the die, characterized by the forward end of the melt flow separator being spaced back from the forward end of the tip by a distance less than the radius of the tip face outward from the discharge end of the wire passage through the tip.

12. The single die structure described in claim 11 characterized by the forward end of the melt flow separator being spaced back from the forward end of the tip by a distance less than the full radius of the tip face.

* * * * *